Oct. 7, 1952     R. OBER     2,613,343
PLURAL VOLTAGE MOTOR
Filed Feb. 1, 1949     4 Sheets-Sheet 1
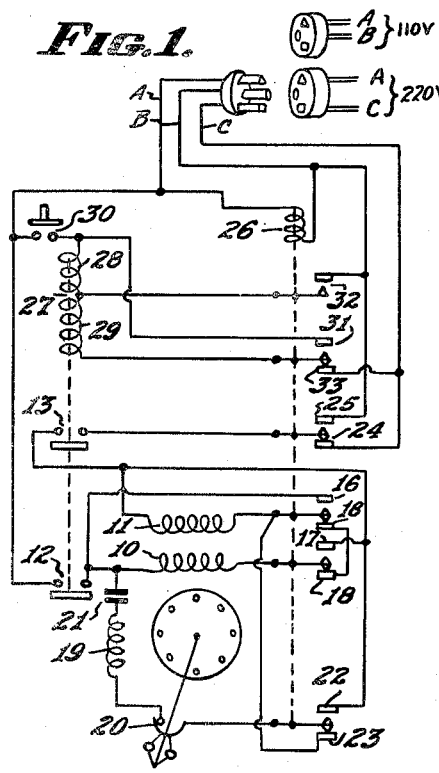
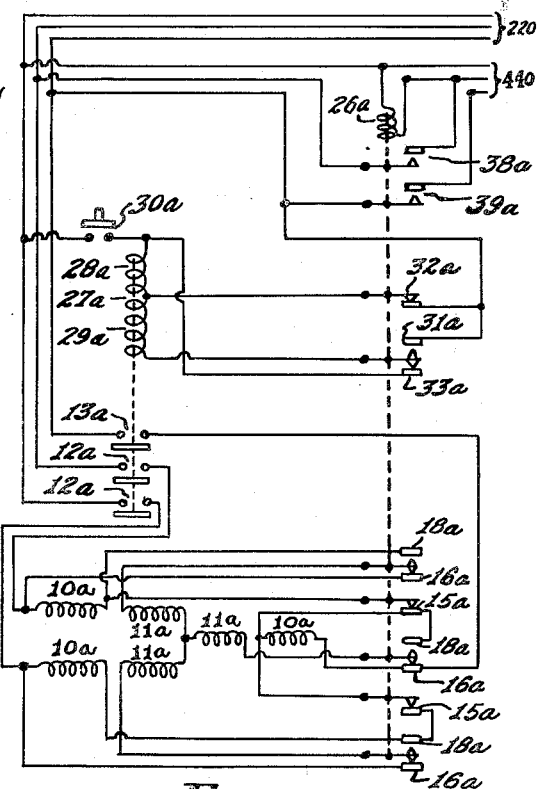
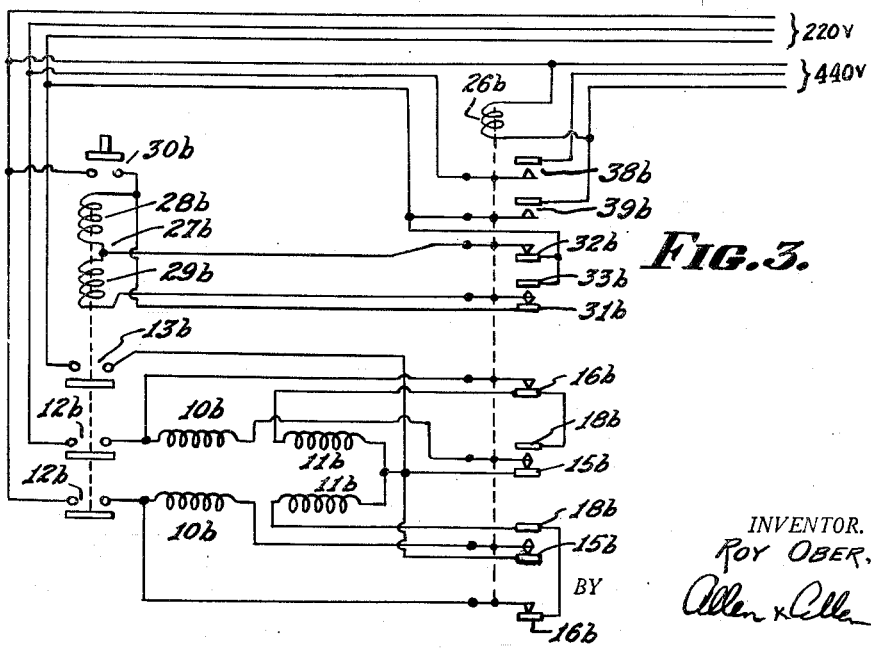
INVENTOR.
ROY OBER
BY
ATTORNEYS.

Oct. 7, 1952            R. OBER            2,613,343
PLURAL VOLTAGE MOTOR
Filed Feb. 1, 1949            4 Sheets-Sheet 2
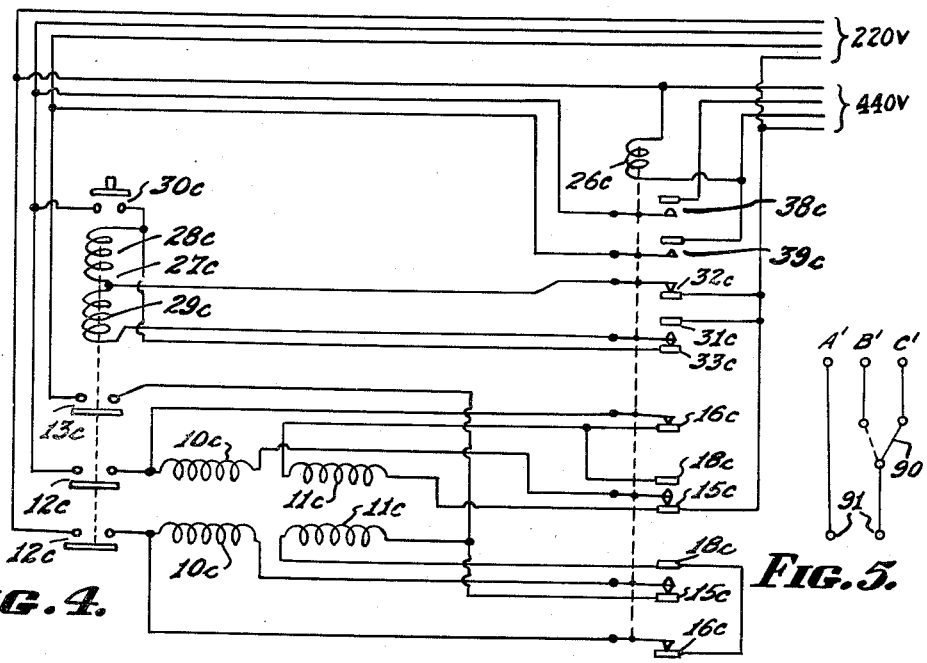
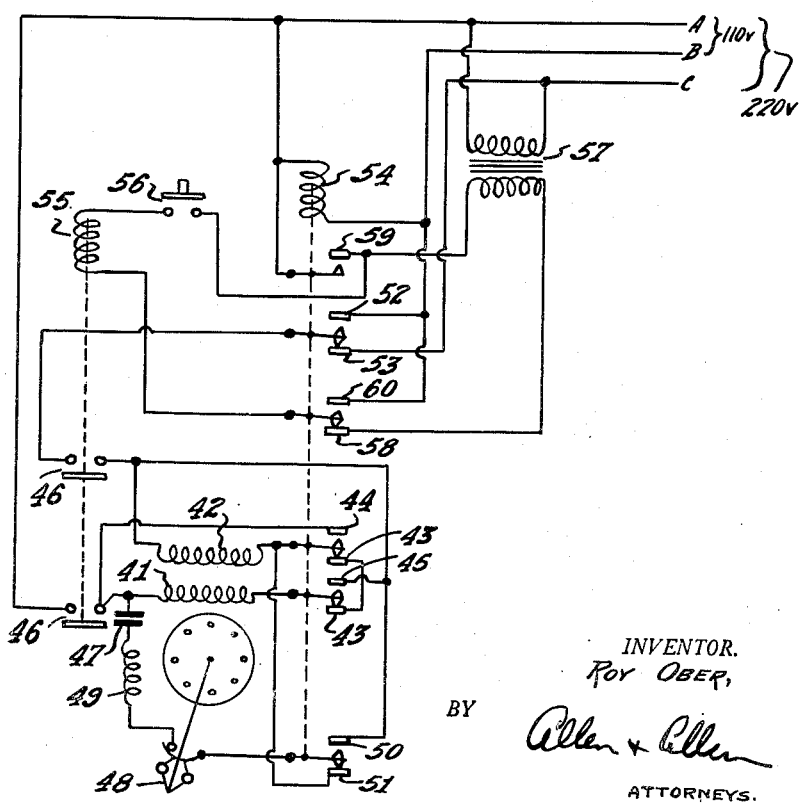
INVENTOR.
ROY OBER,
BY
Allen & Allen
ATTORNEYS.

Oct. 7, 1952   R. OBER   2,613,343
PLURAL VOLTAGE MOTOR
Filed Feb. 1, 1949   4 Sheets-Sheet 3
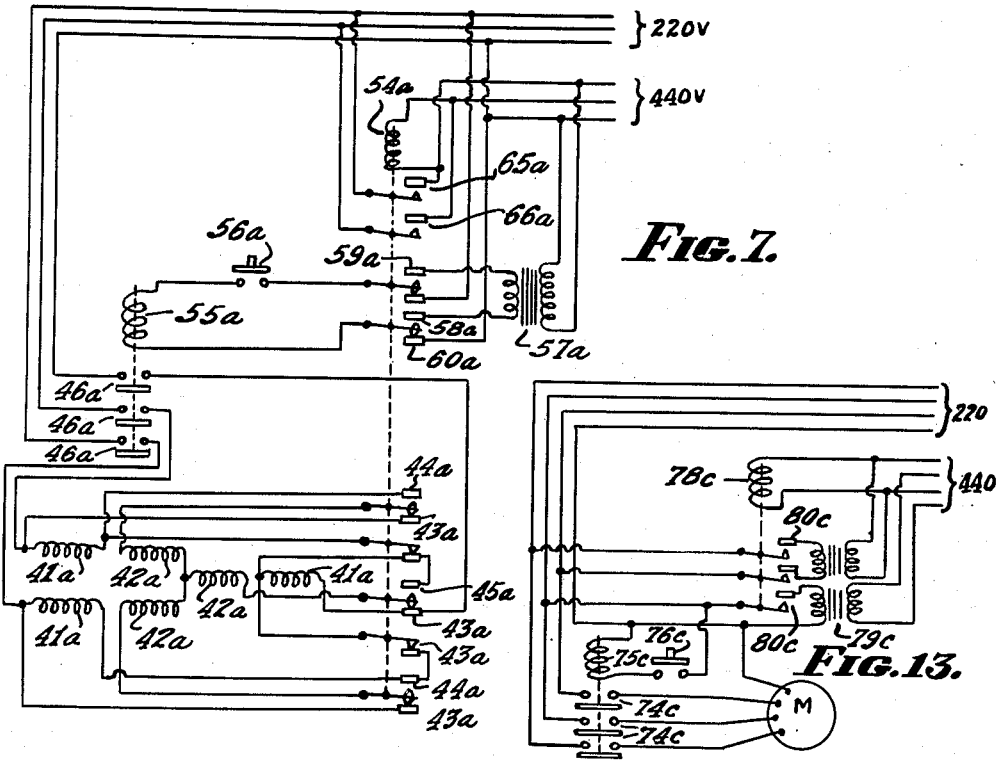
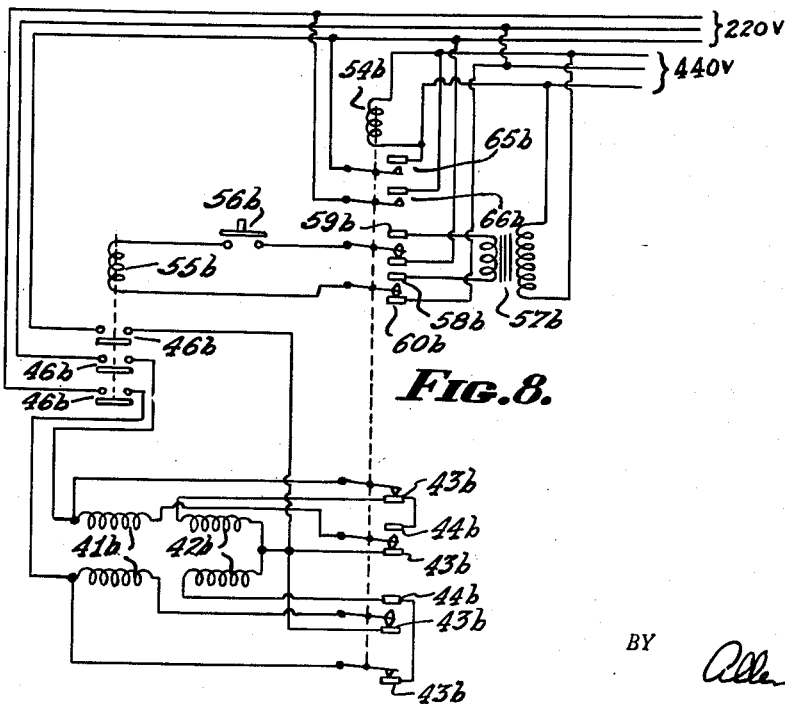
INVENTOR.
ROY OBER,
BY
ATTORNEYS.

Oct. 7, 1952 — R. OBER — 2,613,343
PLURAL VOLTAGE MOTOR
Filed Feb. 1, 1949 — 4 Sheets-Sheet 4

INVENTOR.
ROY OBER,
BY Allen & Allen
ATTORNEYS.

Patented Oct. 7, 1952

2,613,343

UNITED STATES PATENT OFFICE 2,613,343

PLURAL VOLTAGE MOTOR

Roy Ober, Springfield, Ohio, assignor to Robbins & Myers, Inc., Springfield, Ohio, a corporation of Ohio Application February 1, 1949, Serial No. 75,987

3 Claims. (Cl. 318—225)

1

This invention relates to a plural voltage motor, by which is meant an electric motor capable of running on two different voltages. This application is a continuation-in-part of my copending application Serial No. 5,945 filed February 3, 1948.

Electric motors have long been available in which by means of jumpers the connections inside the motor could be changed so that the motor would run on different voltages. However, in each instance of which I am aware a physical act on the part of an operator was necessary in order to change the motor over so that it would run on a different voltage. There are many applications in which it is impractical or undesirable to require an act on the part of the operator to change the motor over from one voltage to another. As a specific example of such a situation I might cite the situation in connection with the delivery of groceries to chain grocery stores, where the delivery trucks have electrically operated hoisting mechanism for the tailboard. The motors for running such hoists are not operated by the electrical system of the truck, but are supplied with current from an outside source; that is, by an outlet in the store front. In any given chain of stores it will be found that some are wired for 220 volts, and some are wired for 110 volts. Since deliveries are usually made at night it is impractical for the driver of the truck in each case to ascertain what voltage is provided at the particular stores where the delivery is to be made. It is desirable that he be able to plug his power line into a receptacle at the store and to have the motor function regardless of whether the voltage happens to be 220 volts or 110 volts.

With the foregoing considerations in mind it is an object of my invention to provide an electric motor and a wiring arrangement therefor whereby the motor will run on either of two different voltages without the necessary intervention of an operator.

It is another object of my invention to provide automatic means for converting the motor from 220 volt operation to 110 volt operation, and vice versa.

It is another object of my invention to provide a motor having a polarized plug adapted to engage in a polarized receptacle. The polarized plug will have a number of leads necessary for running that motor on both said voltages, while any given receptacle will have only certain of its contacts wired up. Those receptacles provided with 220 volts will have certain terminals wired, and those wired for 110 volts will have other

2 terminals wired, so that when the polarized plug is inserted into the polarized receptacle the proper connections to the motor are automatically made.

It is yet another object of my invention to provide a coil for converting the motor from operation at one voltage to operation at a different voltage.

Still other objects include the provision of arrangements as outlined above for a single phase current, 2-phase current and 3-phase current, and in connection with 2-phase current to provide such arrangements suitable for 3-wire systems, and for 4-wire systems.

These and other objects of my invention which will be pointed out in more detail hereinafter, or which will be apparent to one skilled in the art upon reading these specifications, I accomplish by that certain construction and arrangement of parts of which I shall now describe certain exemplary embodiments.

Reference is made to the drawings forming a part hereof and in which:

Figure 1 is a wiring diagram according to one embodiment showing single phase operation.

Figure 2 is a diagram similar to Figure 1 showing 3-phase operation.

Figure 3 is a diagram similar to the others showing 2-phase 3-wire operation.

Figure 4 is a similar view showing 2-phase 4-wire operation.

Figure 5 is a schematic diagram of an accessory which may be used.

Figure 6 is a view of another embodiment of the invention showing single phase operation.

Figure 7 is a view similar to Figure 6 showing 3-phase operation.

Figure 8 is a view similar to Figure 7 showing 2-phase, 3-wire operation.

Figure 13 is a view similar to Figure 12 showing 2-phase, 4-wire operation.

Figure 9:
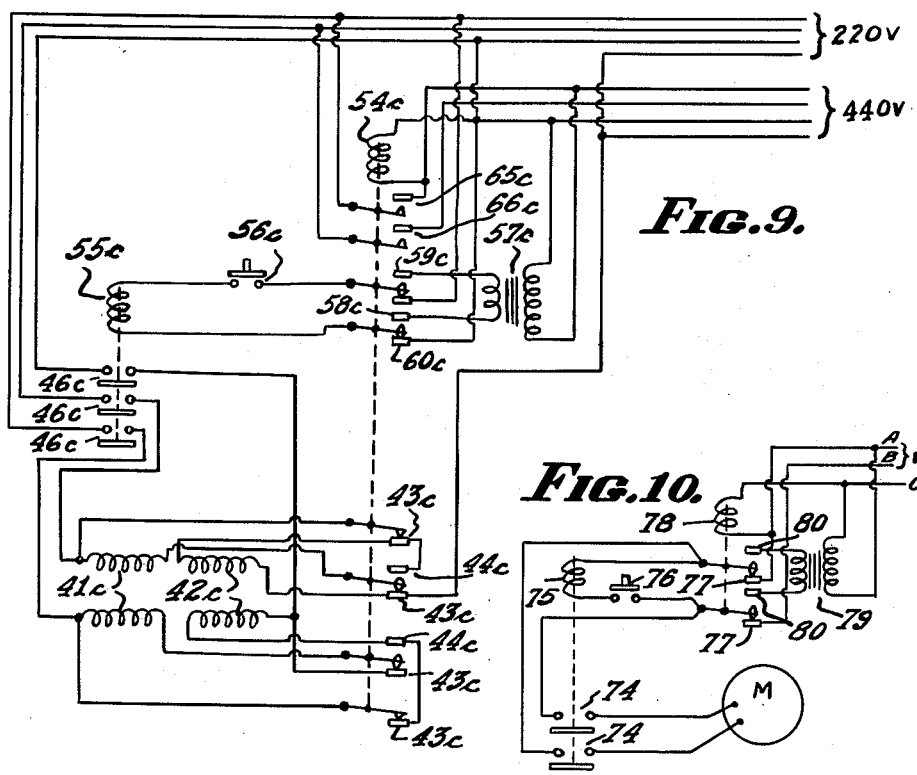
Figure 9 is a view similar to Figure 8 showing 2-phase 4-wire operation.

Briefly, in the practice of my invention I provide an electric motor so arranged that by the operation of a number of contacts it may be changed over from one voltage to another, e. g. from 220 volt operation to 110 volt operation. The motor circuit has a number of terminals, certain of which are arranged to be connected to a source of 220 volts, and certain which are arranged to be connected to a source of 110 volts. In the 110 volt circuit I provide a coil for actuating the contacts above mentioned. Certain of these contacts are normally open, and others are normally closed. When the motor is connected to a source of 220 volts, the motor connections are such that it will run on 220 volts; when the motor is connected to a source of 110 volts the above mentioned coil is energized and changes the motor connections so that it will run on 110 volts.

It will be clear that while I shall describe my invention in connection with a motor designed to run on 220 volts or 110 volts, it is applicable to a motor designed to run on any two different voltages and I do not intend to limit myself specifically to the voltages herein described. I have shown herein basically three different ways in which my invention may be carried out and I shall show it as to each of the three basic ways for four different wiring systems, i. e. single phase, 3-phase, 2-phase 3-wire, and 2-phase 4-wire.

Referring first to Figures 1 to 4 inclusive, I have illustrated a motor having two running windings 10 and 11. Starting switches are indicated at 12 and 13. The winding circuits are provided with the contacts 16, 17 and 18 as shown. As will be clear from Figures 1 and 2, when the contacts 18 are closed and the contacts 16 and 17 are open, the windings 10 and 11 are in series. When the contacts 16 and 17 are closed and the contacts 18 are open, the windings are connected in parallel. In Figure 1 the various contacts are shown in their high voltage position.

The motor is provided with a starting winding at 19 and a centrifugal switch is diagrammatically indicated at 20. The usual condenser is provided at 21. Switches 22 and 23 are provided for the starting winding 19 so that on 220 volts, as seen in Figure 1, the contact 22 is open and 23 is closed, whereby the starting current passes through the starting winding 19 and also through one of the running windings at 11. On 110 volts, when the running windings are in parallel the contact 23 is open and 22 is closed, so that the starting current does not pass through either of the running windings.

A pair of contacts 24 and 25 are provided to complete the motor circuit either through the 110 volt terminals or the 220 volt terminals. The 220 volt terminals are indicated at A and C, and the 110 volt terminals are indicated at A and B.

Also, across the 110 volt stator circuit I provide a coil 26 which will be energized when the terminals A and B are energized. This coil is arranged to actuate the switches or contacts 16, 17 and 18, 22, 23, 24 and 25, to close the normally open ones and to open the normally closed ones. Thus, the contacts 18, 23 and 24 which are normally closed are open, and the contacts 16, 17, 22 and 25 which are normally open are closed when the coil 26 is energized.

The starting switches 12 and 13 are energized by a coil 27 which is provided with two windings 28 and 29. The coil 27 is energized by the push button 30. The normally open switches 31 and 32, and a normally closed switch 33, are provided to place the windings 28 and 29 either in series or in parallel. Normally with 220 volts the windings 28 and 29 are in series, but when the 110 volts are applied across the terminals A B, the coil 26 also actuates the normally open switches 31 and 32 to close them, and the normally closed switch 33 is opened up, whereby the windings 28 and 29 are thrown into parallel.

According to the arrangement described above, the coil 26 in the 110 volt circuit throws the series motor coils into parallel and the series starting switch coils into parallel.

From the foregoing detailed description it will be seen that the system (in two of the modifications) is designed for an electric motor with a stator winding divided into two equal sections. A set of electrically operated switches, a polarized plug and receptacle and a manually operative switch for controlling the current through the operating coils of the switches are provided. The basic principle involved is that with a double winding stator in the motor the two sections of the winding can be connected in parallel for low voltage operation or in series for high voltage operation. The change from series to parallel connections requires a regrouping of the motor leads. With the control system described herein the regrouping is accomplished by the electrically operative switches entirely automatically without any adjustment being required of the operator and without the operator even having to know what the voltage situation is.

Thus the stator winding is divided into the two sections 10 and 11, an electrically operative switch having contacts 12 and 13, an operating coil 27 divided into two sections 28 and 29 and a switch with the contacts 16, 17, 18, 22, 23, 24, 25, 31, 32 and 33 and an operating coil 26. A manual switch 30 is provided for energizing the coil 27. It may be pointed out that the starting winding 19, the capacitor 21 and the contact 20 are only incidental to the particular type of motor being illustrated and have nothing to do with the invention in question.

The polarized receptacle is wired differently for 110 volts and for 220 volts so that while three poles are available, only two of the poles are connected. When the plug is pushed into the receptacle, assuming the receptacle to have the 110 volt terminals energized, 110 volt current flows through the operating coil 26 from A to B. This current through the coil 26 causes the switches 16, 17, 18, 22, 23, 24, 25, 31, 32 and 33 to operate to open the normally closed switches and close the normally open ones as will be clear from a consideration of Figure 1. The change in position of the electric contact causes the motor stator sections 10 and 11 and the operating coil sections 28 and 29 to be connected in parallel for operation on 110 volts. These contacts remain in this position as long as the plug remains in the receptacle.

If the plug is pushed into a receptacle wired for 220 volts there will be no current flow in the coil 26 because there is no connection in this receptacle for the lead B. All the contacts operated by the coil 26 will therefore remain in the position shown in Figure 1. With the contacts so arranged the motor stator sections 10 and 11 and the operating coil sections 28 and 29 remain in series ready for operation on 220 volts. When the plug has been inserted in the receptacle all that is necessary in order to start the motor is to operate the manual switch 30 to energize the coil 27 which closes the contacts 12 and 13 supplying current to the motor.

The above described arrangement is shown in Figures 2, 3 and 4, adapted to various wiring systems. Thus, in Figure 2 it is adapted to a 3-phase system. In Figure 2 I have shown the motor as having a pair of running windings 10a and 11a, each pair of which may be placed in series or parallel by means of the contacts 16a and 18a, and, again, I have provided a starting switch coil 27a having the windings 28a and 29a, which may be placed in series or parallel by means of the contacts 31a, 32a and 33a. In other respects the reference numerals in Figure 2 correspond to those used in Figure 1, but with the suffix "a."

In Figure 3 I have shown an arrangement of Figures 1 and 2 adapted to a 2-phase 3-wire system, and in this figure the corresponding elements bear corresponding numerals, but with the suffix "b."

In Figure 4 I have shown the arrangement of Figures 1 and 2 adapted to a 2-phase 4-wire system wherein the reference numerals are the same as in the previous figures, except with the suffix "c."

In Figure 6 I have shown a second embodiment of the invention adapted to single phase operation. Generally speaking, according to this embodiment there is again provided a motor having two running windings which may be placed in series or in parallel. These windings are normally in series for 220 volt operation, and for 110 volt operation they are thrown in parallel by means of a coil in the 110 volt line as before. In this embodiment, however, the starting coil is energized on 220 volts through the secondary of a step-down transformer, and on 110 volts the coil is thrown across the 110 volt line. Thus, in Figure 6 the motor has the running windings 41 and 42 which may be placed in series when the contacts 43 are closed, or in parallel when the contacts 43 are open and the contacts 44 and 45 are closed. The starting switches are shown at 46. The motor may have the usual condenser 47, centrifugal switch 48 and starting winding 49, the starting winding being cut in and out of the circuit by means of the contacts 50 and 51 as described above in connection with Figure 1. The contacts 52 and 53 perform the same functions as the contacts 24 and 25 in Figure 1.

The coil 54 corresponds to the coil 26, and the coil 55 corresponds to the coil 27. The coil 55 actuates the contacts or starting switches 46 when the push button 56 is depressed. It will be observed that, as shown in Figure 6, when 220 volts are applied to the terminals A C, the primary of the transformer 57 is energized, setting up a current in the secondary thereof, which flows in a circuit through the contact 58 which is closed, the coil 55 and across the push button 56 when the latter is depressed. The contacts 59 and 60 are open. When 110 volts are applied across the terminals A B current flows through the coil 54, which throws the various contacts to close the normally open ones, and open the normally closed ones, so that the coil 55 is in effect across the 110 volt line with the contacts 59 and 60 closed, and the contact 58 open. On 110 volts, therefore, the transformer 57 does not function.

Figures 7, 8 and 9 show the embodiment of Figure 6 as applied to respectively 3-phase current, 2-phase 3-wire, and 2-phase 4-wire circuits. In this group of figures again the various parts corresponding to those in Figure 6 will have the same reference numerals, but with the suffixes a, b and c, respectively. The operation of these circuits will be understood from what has been said in connection with the operation of the circuit in Figure 6.

In Figures 10 to 13 I have shown the third embodiment of the invention, in which the motor embodies a transformer, and in which the motor when connected to the 110 volt leads operates on 110 volts from the line, and when connected to the 220 volt leads operates on 110 volts from the transformer secondary.

Figure 10:
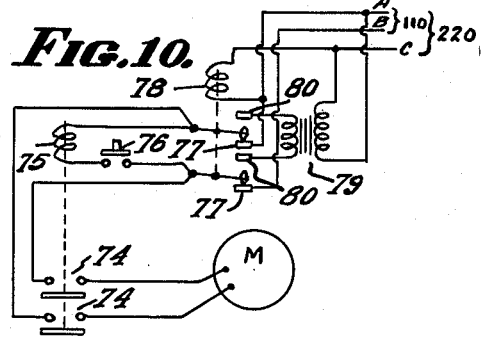
Figure 10 is a view of a third embodiment of the invention showing single phase operation.

Thus, in Figure 10 I have shown a single phase arrangement arranged for operation respectively on 220 volts and 110 volts.

The starting switches are shown at 74 and are actuated by the starting switch coil 75 when the push button 76 is depressed. Contacts 77 when closed put the motor across the 110 volt terminals A B. Across the 220 volt terminals A C there is the coil 78 which corresponds to the coil 26 of the first embodiment and the coil 54 of the second embodiment. This coil when energized throws the various contacts to ready the motor for the 220 volt operation. On 220 volts current also flows through the primary of the transformer 79, setting up a current in the secondary thereof so that when the contacts 80 are closed and the contacts 77 are open, the motor runs on the 110 volts delivered by the secondary of the transformer 79.

Figure 11:
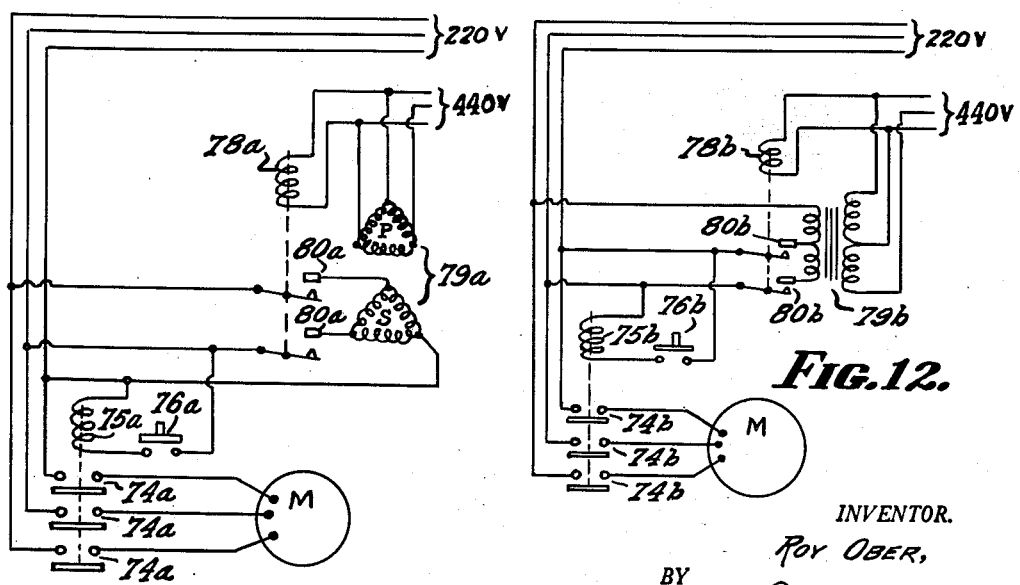
Figure 11 is a view similar to Figure 10 showing 3-phase operation.
Figure 12:
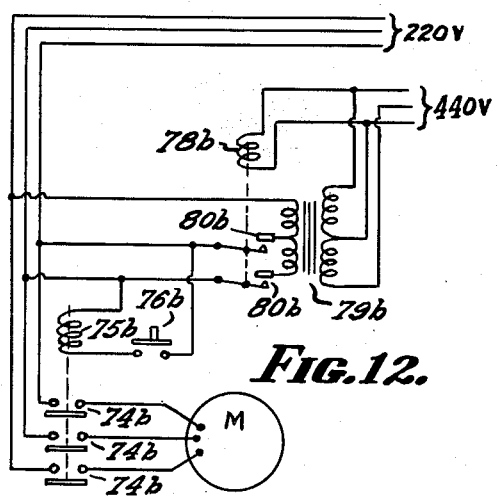
Figure 12 is a view similar to Figure 11 showing 2-phase, 3-wire operation.

Again, in Figures 11, 12 and 13 I have shown the embodiment of Figure 10 as applied to 3-phase operation, 2-phase 3-wire operation, and 2-phase 4-wire operation respectively, and again corresponding elements bear the same reference numerals as in Figure 10, but with the suffixes a, b and c respectively.

The operation of the circuits of Figures 11, 12 and 13 will be understood from what has been said in connection with Figure 10.

My invention contemplates that the motor will have a polarized plug and that the places where the motor is to be used will be provided with polarized receptacles. For example, in single phase operation the polarized plug and receptacle will have three terminals corresponding to the terminals A, B and C in predetermined positions. In locations having 220 volts only the terminals A and C will be connected, while in locations having 110 volts only the terminals A and B will be connected. Since the polarized plug can only be inserted in the polarized receptacle in one orientation, the mere act of inserting the polarized plug in the polarized receptacle will cause the motor to run on whatever voltage is provided, either through the terminals A B, or the terminals A C, as described above. It will be understood that in the case of 3-phase operation and with 2-phase 3-wire operation both the plug and receptacle will have 6 terminals, 3 certain ones of which will be connected in locations having 220 volts and the other 3 of which will be connected in locations having 440 volts. In the case of 2-phase 4-wire circuits the plug and receptacle will have 8 terminals, 4 certain ones of which will be connected for one voltage and the other 4 of which will be connected for the other voltage.

In cases where it is impractical to re-wire the receptacles of the 3-wire, 6-wire or 8-wire polarized receptacles, as outlined above, it may be desirable to provide an accessory as diagrammatically indicated in Figure 5. This accessory can take any desired form, but for single phase operation it would include a 3-way polarized receptacle into which the operator could plug the 3-way polarized plug of the motor and the other end would be provided with a conventional 2-element plug. A switch will be provided whereby one of the two male elements can be connected either to the female elements B or C while the other male element will always be connected to the female element A. Thus, if no 3-way polarized plug is provided where the motor is to be used, the operator can plug in to the terminals A', B' and C' and set his switch 90 to the appropriate voltage and then plug the male element 91 into any available outlet. It will be clear to those skilled in the art how, with multiple switches, the device of Figure 6 may be adapted to 3-phase operation and to 2-phase 3-wire or 4-wire operation.

While I have shown three specific arrangements for accomplishing the desired result, together with four different wiring arrangements showing each of the three embodiments, it is to be understood that I do not intend to limit myself to the precise forms illustrated, since numerous modifications will suggest themselves to those skilled in the art.

What I claim as new and desire to secure by Letters Patent is set forth in the claims which follow:

1. A control system for an A. C. motor operable on either of two voltages, comprising a polarized plug having a plurality of prongs adapted to be inserted in a polarized receptacle having a plurality of sockets, said polarized receptacle, when connected to one of said operating voltages having certain of said sockets connected to a source of said voltage and the remainder of its sockets blank, and when connected to the other of said voltages having sockets, other than the sockets connected to said first voltage source, connected to a source of said second voltage and the remainder of its sockets blank, a plurality of leads connected between said prongs and said motor for energizing said motor from either of said voltages, relay means having a coil connected between certain of said leads so that said coil is energized when said motor is connected to one of said voltages and non-energized when connected to the other of said voltages, and switch means operated by said coil for changing the circuit connections of said motor to adapt it to operate on either of said voltages.

2. A system as defined in claim 1, wherein the motor has a plurality of winding sections, and wherein said switch means are adapted to change the connections of said winding sections from series to parallel.

3. A system as defined in claim 2, including a starting switch, a coil for operating said starting switch, and a push button for energizing said last named coil, said last named coil also having a plurality of winding sections, and said switch means being also adapted to change the connections of the winding sections of said last named coil from series to parallel.

ROY OBER.

REFERENCES CITED

The following references are of record in the file of this patent:

UNITED STATES PATENTS

| Number | Name | Date |
|---|---|---|
| 2,445,434 | Hornbarger | July 20, 1948 |